(12) United States Patent
Glad et al.

(10) Patent No.: US 8,088,339 B2
(45) Date of Patent: Jan. 3, 2012

(54) DRAINAGE ASSEMBLY WITH UPWARD OPENING AND FLAT SEAT WITHOUT RETENTION AREAS FOR ENAMELED CHEMICAL REACTOR

(75) Inventors: Roger Glad, Gumbrechtshoffen (FR); Rémy Schmidt, Offwiller (FR)

(73) Assignee: De Dietrich, Niederbronn-les-Bains (FR)

( * ) Notice: Subject to any disclaimer, the term of this patent is extended or adjusted under 35 U.S.C. 154(b) by 136 days.

(21) Appl. No.: 12/528,003

(22) PCT Filed: Feb. 21, 2008

(86) PCT No.: PCT/FR2008/000225
§ 371 (c)(1),
(2), (4) Date: Sep. 29, 2009

(87) PCT Pub. No.: WO2008/122710
PCT Pub. Date: Oct. 16, 2008

(65) Prior Publication Data
US 2010/0166617 A1    Jul. 1, 2010

(30) Foreign Application Priority Data

Feb. 21, 2007   (FR) ..................... 07 01223

(51) Int. Cl.
B01J 19/30   (2006.01)
F16K 31/00   (2006.01)

(52) U.S. Cl. ........ 422/310; 251/144; 251/196; 251/214; 251/330; 251/331; 251/335.2

(58) Field of Classification Search .................. 422/310; 251/335.2, 144, 196, 214, 330, 331
See application file for complete search history.

(56) References Cited

U.S. PATENT DOCUMENTS

| | | | | |
|---|---|---|---|---|
| 860,865 | A * | 7/1907 | Hartman | 137/340 |
| 2,454,160 | A * | 11/1948 | Greene | 137/375 |
| 3,030,068 | A * | 4/1962 | Priese | 251/214 |
| 3,177,887 | A * | 4/1965 | Priese | 137/74 |
| 3,379,410 | A * | 4/1968 | Stewart, Jr. | 251/359 |
| 3,380,706 | A * | 4/1968 | Scaramucci | 251/148 |
| 4,359,204 | A * | 11/1982 | Williams | 251/331 |
| 4,457,491 | A * | 7/1984 | Dudman | 251/317 |
| 4,464,066 | A | 8/1984 | Cappuccilli | |
| 4,649,949 | A * | 3/1987 | Scobie et al. | 137/67 |
| 4,822,570 | A | 4/1989 | Lerman et al. | |
| 5,360,198 | A | 11/1994 | Amorese et al. | |
| 6,642,724 | B2 | 11/2003 | Cronimus | |

(Continued)

FOREIGN PATENT DOCUMENTS

EP    0 462 382 A2   12/1991

(Continued)

*Primary Examiner* — Walter D Griffin
*Assistant Examiner* — Huy-Tram Nguyen
(74) *Attorney, Agent, or Firm* — Davis & Bujold, P.L.L.C.

(57) ABSTRACT

The invention relates to a drainage assembly of the type having an upward opening for the draining opening of a new or existing chemical reactor, particularly of the enameled type, characterized in that the outer outlet opening (6) for the drainage is provided in the lower portion thereof with a removable seat part in the form of a planar annual seal (11) having an upper portion with at least one recess (21) used as a seat for the under-face of the head (10) of the valve and as a full flow ramp. The invention is particularly intended for the manufacturers and users of chemical reactors, in particular of the enameled type.

18 Claims, 4 Drawing Sheets

U.S. PATENT DOCUMENTS

| | | | |
|---|---|---|---|
| 2003/0015681 A1* | 1/2003 | Chatufale | 251/329 |
| 2003/0062503 A1* | 4/2003 | Newberg | 251/335.2 |
| 2004/0016460 A1* | 1/2004 | Newberg | 137/551 |
| 2004/0021121 A1 | 2/2004 | Newberg | |

FOREIGN PATENT DOCUMENTS

| | | |
|---|---|---|
| EP | 1 176 348 A1 | 1/2002 |
| GB | 2 040 566 A | 8/1980 |

* cited by examiner

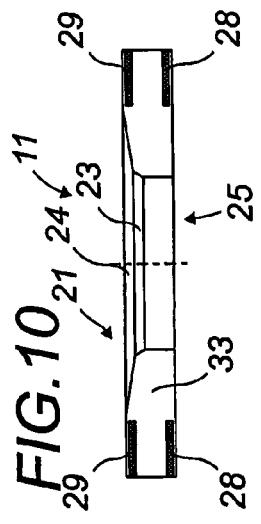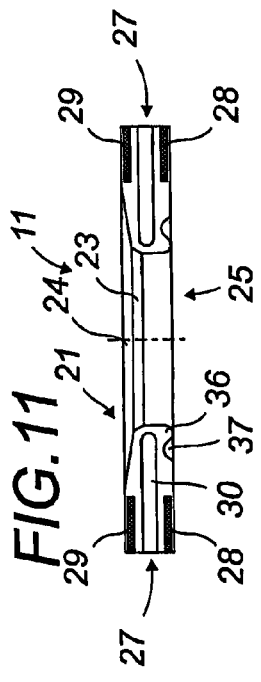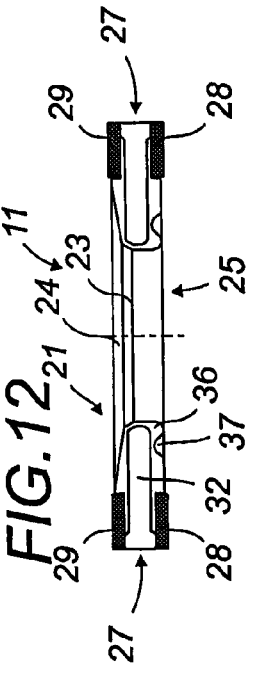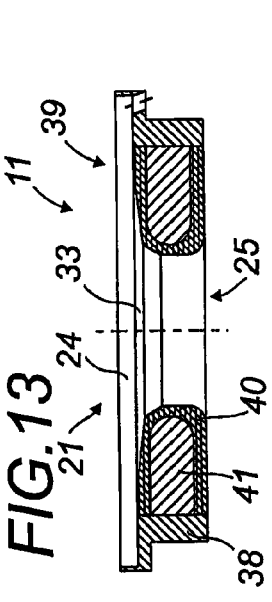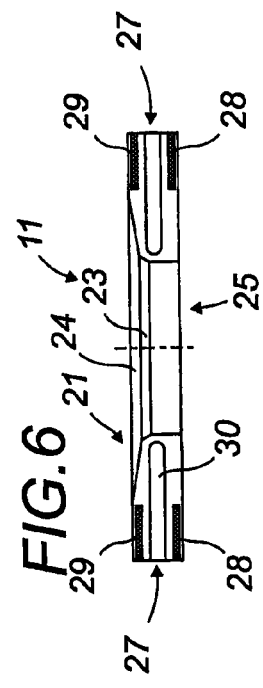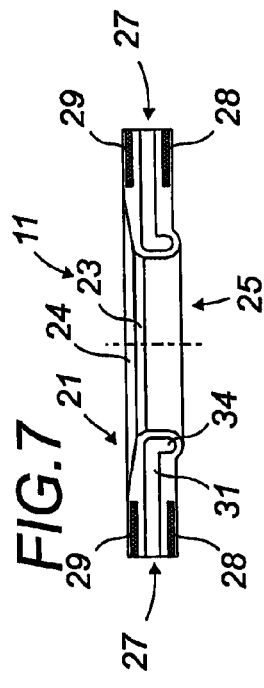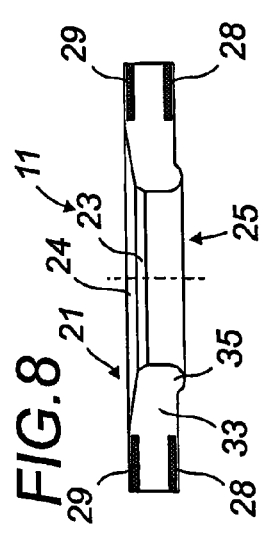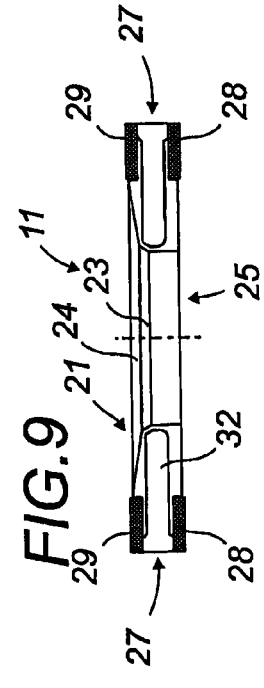

DRAINAGE ASSEMBLY WITH UPWARD OPENING AND FLAT SEAT WITHOUT RETENTION AREAS FOR ENAMELED CHEMICAL REACTOR

This application is a National Stage completion of PCT/FR2008/000225 filed Feb. 21, 2008, which claims priority from French patent application Ser. No. 07/01223 filed Feb. 21, 2007.

FIELD OF THE INVENTION

The present invention relates to a drainage assembly having an upward opening sluice, more specifically, for enameled chemical reactors.

In particular it comprises two planar surfaces which enclose and grip a flat seating of the valve head, providing sealing when closed and allowing complete discharge when open. The invention can be attached to the outlet of any reactor, either new or existing.

BACKGROUND OF THE INVENTION

In the type of reactor this invention concerns, the head of the movable valve element on the drainage assemblies is housed in the evacuation space of the drainage orifice so as to free the outlet area when the movable element of the drainage assembly is in the upper open position.

Conventionally, when in the closed position, this head rests on a seating made of chemically resistant synthetic material, for example, PTFE.

Therefore, according to the prior art technique, this seating is formed in the upper portion of a sealing piece with a tubular body and a circular base forming a peripheral blocking and maintaining shoulder. The upper portion of this sealing piece serves as a seating for the movable element of the seal assembly and its lower shoulder portion acts as a sealing surface against the projecting portion of the drainage orifice pipe. The tubular portion is introduced into the evacuation pipe of the drainage orifice. It is adapted to the diameter of this evacuation pipe and its shoulder blocks and maintains it in place penetrating the pipe.

On its other surface, this tubular seating and sealing piece is applied tightly against the upper flanged rim of the drainage assembly body.

This prior art technique has several important disadvantages.

The first disadvantage relates to retention of product which happens in the interstice located between the seating and the drainage pipe. This causes cross-contamination of products during two successive uses of the reactor. Actually, the adjustment between the seating and sealing element and the evacuation pipe is not perfect. Some product originating from the reaction in progress penetrates the small space that exists between this element and the interior lateral surface of the evacuation pipe of the outlet orifice.

This small space is quasi-inaccessible, making it difficult or even impossible for cleaning and disinfection products to penetrate it, such that the remaining liquid constitutes a source of cross-contamination between the two products of two successive reactions; this is hardly desirable and even contraindicated, especially in the food and pharmaceutical industries.

Moreover, the product trapped in this interstice may crystallize, causing serious difficulties when detaching the valve and consequently a high risk that the enamel coating will deteriorate.

SUMMARY OF THE INVENTION

The goal of the present invention is to remedy these principal disadvantages.

The first benefit of this invention is the complete absence of cross-contamination because of its smooth surfaces that lack interstices, and the absence of any contamination because of elimination of areas with limited access that are hidden when cleaning and disinfecting.

Additionally, the drainage assembly of the invention can be attached to any type of currently used reactor, either new or existing, with an outlet that conforms to the general rules of standardization, independent of its particular shape, whether it be a tubular drainage outlet or one known as a thick flange outlet.

It is only necessary to change the seating and the movable valve element in the lower mechanical assembly to obtain a drainage assembly with a full flow valve seating, thereby eliminating the retention area with its related problems and consequences, particularly those arising from product contamination and/or crystallization causing problems with disassembly and general risk of enamel deterioration.

Obviously, the invention also makes it possible to attach this type of drainage assembly to new reactors. It is only necessary to provide a seal seating that is adapted to the shape of the corresponding valve head.

In summary, the invention offers the cumulative advantages of full flow, absence of any dead zone, ease in cleaning and disassembly, and the ability to be used on all types of reactors, especially enameled reactors.

BRIEF DESCRIPTION OF THE DRAWINGS

Other characteristics and advantages of the invention will become apparent from reading the following detailed description, taken in conjunction with the attached drawings, in which:

FIGS. 6 through 13 are schematic transverse cross-sections of variations of seating and sealing pieces with which the drainage assembly of the invention may be equipped.

DETAILED DESCRIPTION OF THE PREFERRED EMBODIMENTS

Figure 2:
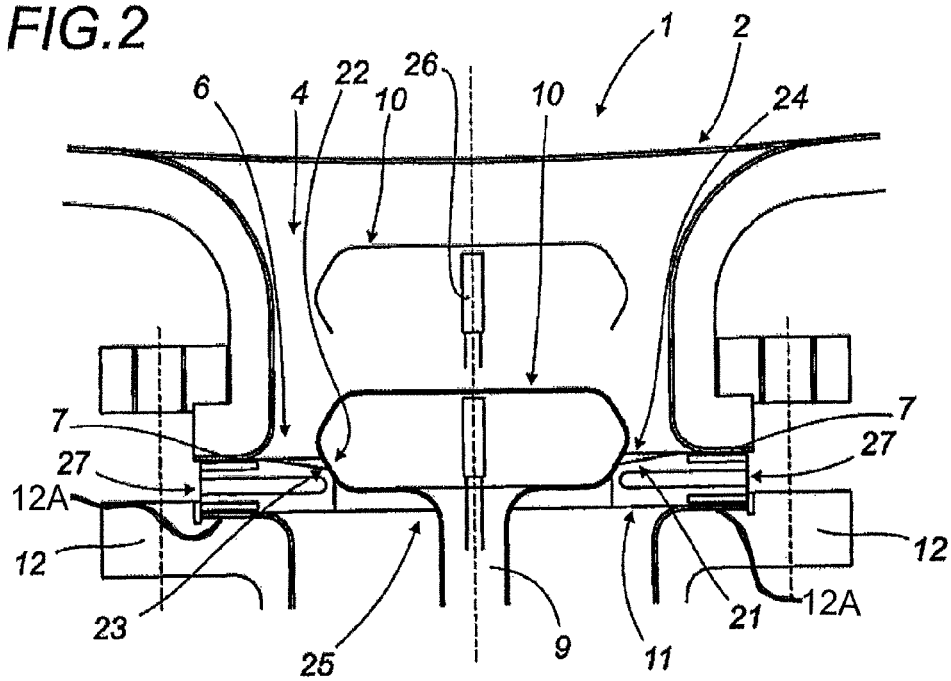
FIGS. 2 and 3 are vertical cross-sections at the level of the movable element and the seating of the drainage assembly according to the invention in the case of a chemical reactor with conventional pipe.
Figure 3:
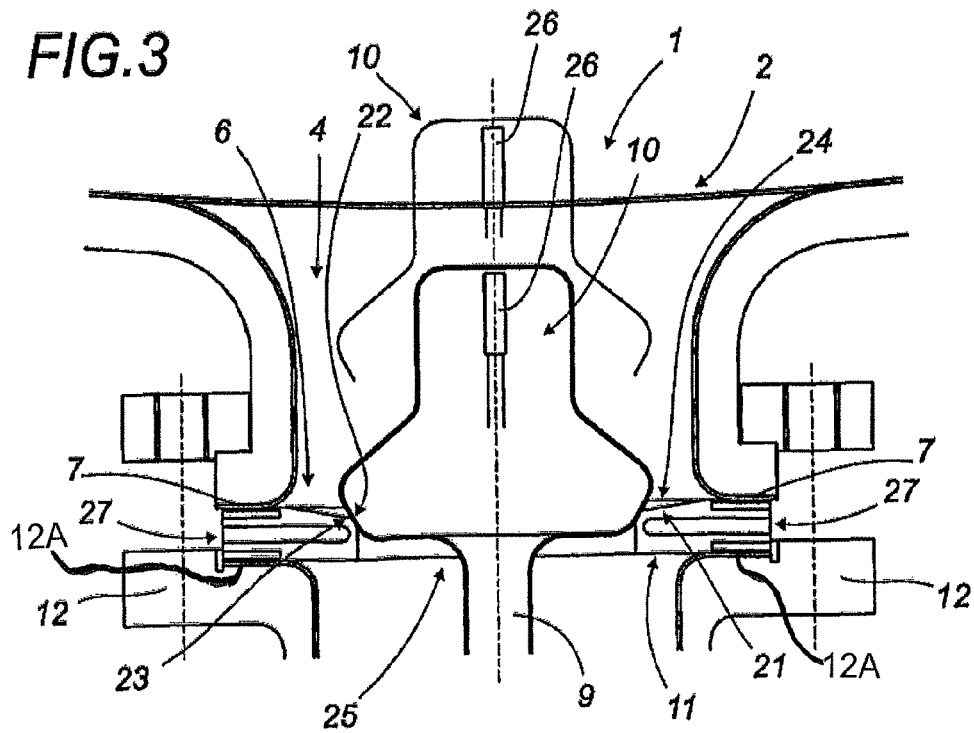
Figure 4:
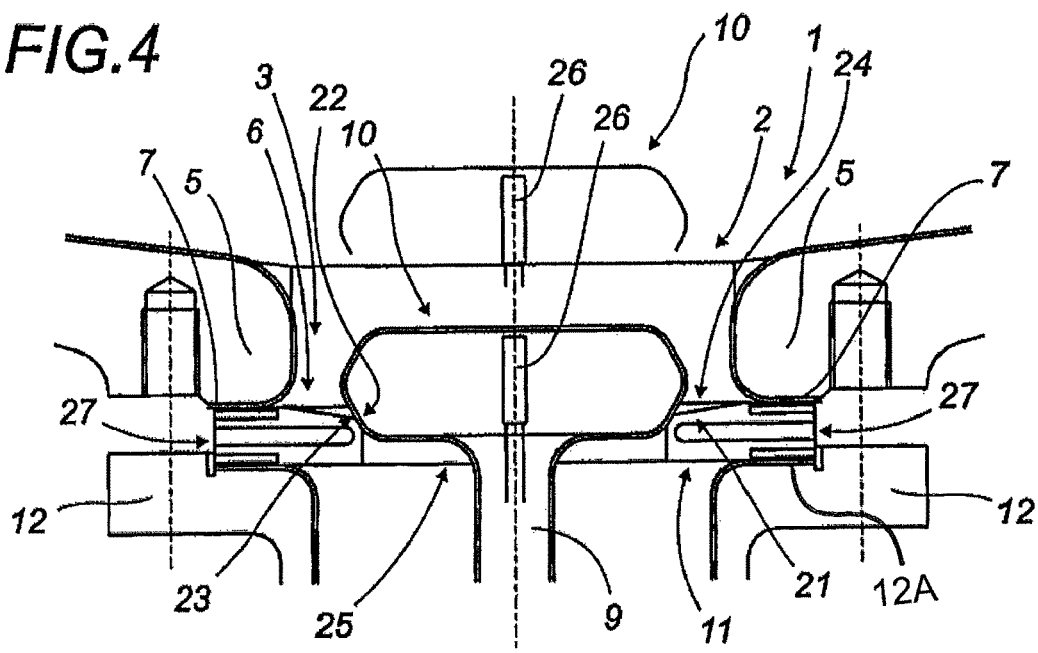
FIGS. 4 and 5 are vertical cross-sections at the level of the movable element and the drainage assembly seating according to the invention in the case of a chemical reactor with a thick flange.
Figure 5:
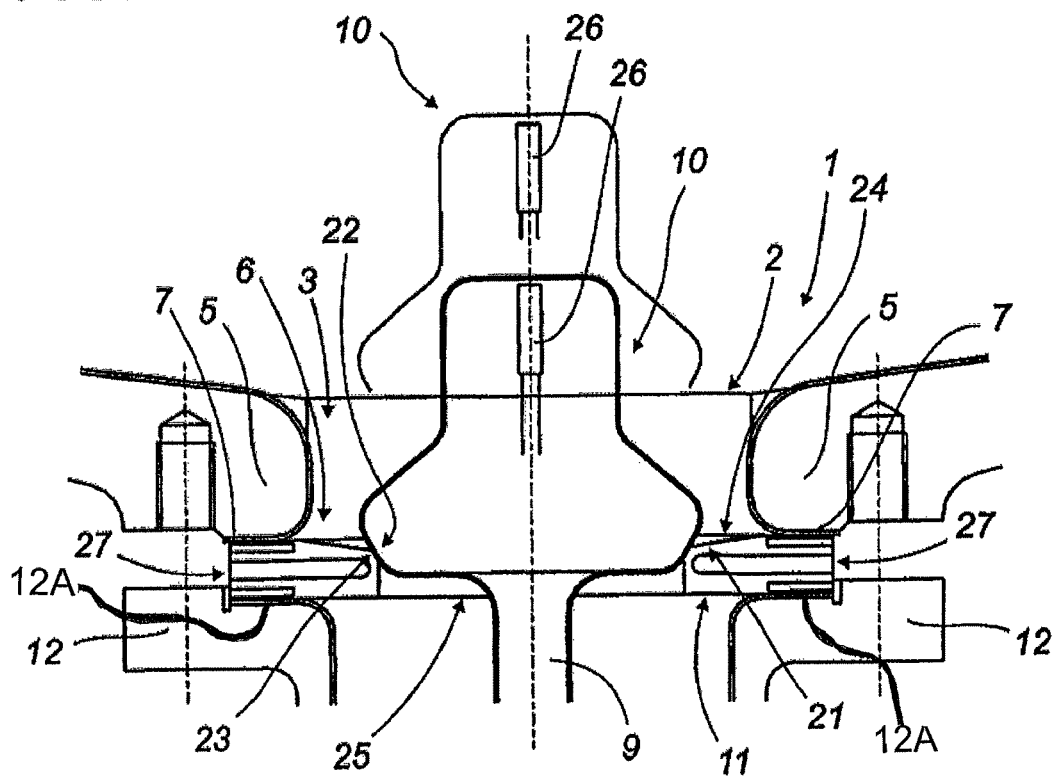

A chemical reactor, and more specifically an enamel type chemical reactor, comprises a bottom 1 with a drainage or emptying orifice 2 extending downward into a cylindrical drainage channel 3 (FIG. 1) which is called, when it is long, a drainage pipe 4 (FIGS. 2 and 3) and when it is shorter, a thick flange channel defined by the internal wall of a thick flange 5 (FIGS. 4 and 5) and opening to the exterior through an exterior outlet orifice 6 defined by an annular return forming a frontal surface 7 that may be the surface of the drainage pipe or that of the thick flange 5.

For the sake of convenience, hereinafter the end portion of this pipe 4 or of this thick flange 5 will be called the outlet orifice structure.

The exterior outlet orifice 6 is blocked by a movable valve 8 formed by a rod 9 and a head 10.

A removable seating and full flow piece 11 tightly contacts frontal surface 7 defining exterior outlet orifice 6 by pressing against it in either the pipe 4 variation or the thick flange 5 variation by being mechanically attached and then clamped, as will be seen below.

Removable piece 11 is, in the embodiment shown, a flat annular seal that is preferably thick, used as a seal and seating for valve head 10 and for completely evacuating the product contained. It is made of chemically inert and resistant material, for example the material known by the acronym "PTFE."

A counter attaching piece 12, for example, in the general form of an attachment flange, holds seating piece 11 sandwiched against frontal surface 7 on the annular outlet return to grip it using a mechanical attachment such as pins which immobilize and compress it in order to procure a seal against the exterior.

Attaching flange 12 also allows the attachment of the mechanical body 13 of the drainage assembly. It forms a part of this mechanical body 13 in which the drainage assembly is housed. It encloses an outlet chamber 14 with a principal lateral outlet 15 and possibly lateral technical access 16, as well as, at the bottom, a sealed guide 17 for valve rod 9 covered with caulking 18.

Figure 1:
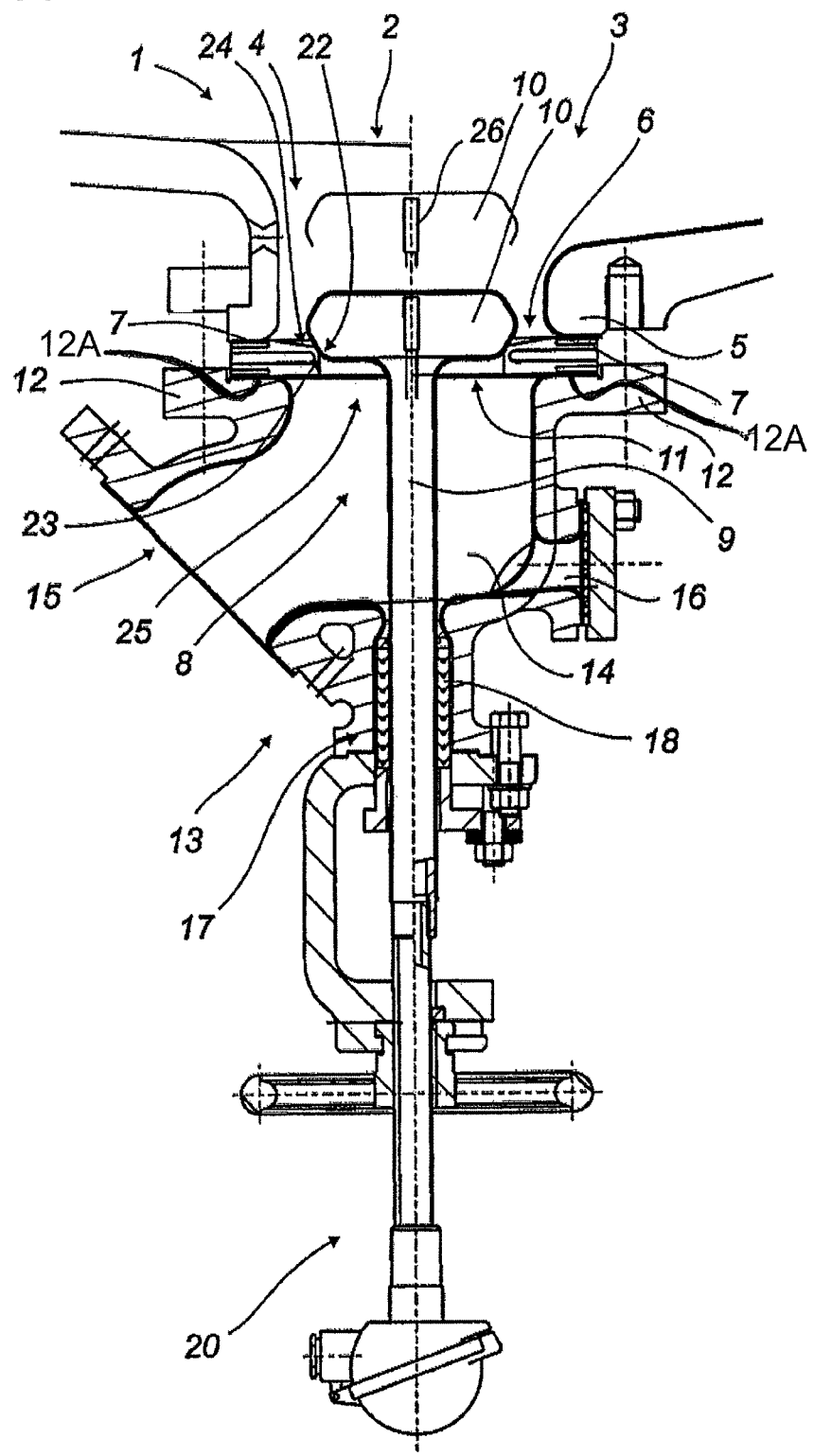
FIG. 1 is a general view in longitudinal cross-section with the upper portion in two half-sections relating to two variations, the drawing showing in a single view two examples of drainage assemblies for a chemical reactor according to the present invention.

The valve extends downward into an actuating mechanism 20 which may have different mechanical forms. FIG. 1 shows a manual mechanism actuating the valve between an upper position in which it is open and a lower position in which it is closed and tightly sealed in its seating.

The invention is not limited to this type of mechanical assembly or actuating mechanism. In the case of existing chemical reactors, it allows a new drainage assembly to be added using a simple replacement procedure.

Seating piece 11 has on the upper portion a hollow or recessed area that converges centrally and downward and serves as a sealing contact with valve head 10 and for full flow.

This recessed area may have a simple or double ramp such as a conical ramp, for example with one narrow interior edge ramp used for sealing and one wider, full flow ramp concentric to and encircling the first ramp. These two ramps have different slopes, a medium slope for the interior edge ramp and a less steep slope for the other ramp.

This example concerns a conical recess 21, one portion of which cooperates with a corresponding conical contact surface 22 located on the base of valve head 10 and which rests on and seals the corresponding portion of conical receiving surface 21 of seating element 11 in the closed position.

More specifically, conical recessed area 21 is a recessed area with dual concentric conical ramps formed from the center toward the exterior first by a conical shoulder 23 cooperating with corresponding conical contact surface 22 on valve head 10 to form a tight seal. Next, there is a conical ramp 24 sloped less steeply than shoulder 23, allowing full product flow. This ramp begins at the periphery of shoulder 23 and extends, for example, to the area of, or up to, the interior peripheral edge of outlet orifice 6.

Obviously piece 11, shaped in conical recessed area 21, defines a circular central opening 25 allowing the evacuating product to pass through it.

It should be noted here that conical recessed area 21 may very well consist of a simple ramp and that it is concentric with opening 25.

Piece 11 is essentially flat and thick and it does not have any central upwardly extending portion, as prior art devices do.

It is possible to provide a protective rim, as will be seen in the variations that follow.

To illustrate the numerous possible applications of the invention on different types of reactor outlets, FIGS. 1 through 5 show the two principal types of outlet configurations for existing reactors, i.e., a reactor outlet with conventional pipe and reactor outlet with a thick flange 5.

In one case the channel 4 forming the drainage pipe is rather long, whereas in the other case it is considerably shorter because it concerns the thick flange variation 5.

According to one variation, head 10 of valve 8 is made taller so as to occupy as much space as possible inside the reactor drainage pipe. For this reason its upper extremity surface reaches in the closed position the level of reactor bottom 1.

A sensor, for example a temperature sensor 26, is placed in valve head 10, preferably near its upper extremity. It shows the temperature of the product contained at the level of reactor bottom 1, and not just the temperature of the product in the inactive area just below and at the level of the drainage orifice.

FIGS. 6 through 13 show different variations of seating piece 11.

All variations have the circular central opening such as opening 25 for the passage of product and complete product evacuation during drainage.

There is a flat annular piece 11 that is semi-rigid in consistency and chemically resistant, having a reinforced periphery on each of its principal surfaces, for example, in the form of higher density upper and lower annular areas or areas formed of a less flexible material that is added on or co-extruded. The thickness of these areas varies depending upon the embodiment. They form integral seals and constitute contact surfaces with front surface 7 of the outlet flange of the reactor or of the peripheral return bordering the exterior outlet orifice 6 of the reactor and with an opposing sandwiching surface 12A of a counter attaching piece 12. The mechanical strength conferred by the tight attachment of these two flanges squeezing the flat seal formed by the annular piece 11 ensures that this piece is immobilized and watertight.

These contact surfaces may be made in the form of an exterior annular framework 27, such as a metal framework. There may be two flat seals 28 and 29, either integral or removable, situated in the periphery of the lower and upper surfaces of the seating piece.

In each of the variations, formed in the upper surface there is the conical recessed area 21 with its conical shoulder 23 in the lower central portion serving as a seating to seal the valve. This central portion is surrounded by a conical ramp 24 with a smaller slope to allow complete flow.

The interior configuration of this seating piece 11 varies.

It may consist of a metal core 30 in the form of an annular disc of various shapes, or an annular piece 32 as shown, or a full space such as space 33 without any insert for the variations in FIGS. 8 and 10.

Other differences exist between the variations.

The lower surface may comprise a projecting interior rim 34 (FIG. 7) or 35 (FIG. 8) extending from a flange.

Other variations (FIGS. 11 and 12) have a non-projecting lower rim 36 but one which is defined by a groove such as groove 37.

The final variation shown in FIG. 13 specifically concerns seatings with an expanded core. It comprises a fireproof peripheral metal rim or ring 38 extending upward into an upper shoulder-like rim 39 forming an enlargement. This fireproof rim 38 is designed to increase the time the seal on the drainage element remains effective, by preventing it from direct exposure to flame in the event of a fire. This metal rim is made in the shape of a peripheral metal band, for example, with an upper edge 39 and may exist on all the other variations.

This flat seal may have an annular body 40 with a core 41.

The invention claimed is:

1. An interchangeable drainage assembly for a cylindrical outlet orifice of one of an enameled chemical reactor having one of a flange type outlet (5) and a pipe outlet (4), for attachment to an exterior structure of the orifice, the drainage assembly comprising:
   a valve (8) comprising a head (10) for forming a fluid tight seal with a mating seating piece (11), the head (10), when moved into an open position spaced from the seating piece (11), facilitating drainage of the reactor via an outlet orifice (6) of the drainage assembly, and the head (10), when moved into a closed position in abutting engagement with the seating piece (11) forming a fluid tight seal so as to facilitate retaining a fluid within the reactor and preventing flow through the outlet orifice (6);
   the valve (8), the head (10), the seating piece (11) and a mechanical body (13) forming the drainage assembly; and
   the seating piece (11) contacting a planar edge surface of the outlet orifice (6) forming a planar frontal surface (7), and the seating piece (11) being sandwiched between the planar frontal surface (7) of the reactor and an opposing sandwiching surface (12A) of an upper flanged portion (12) of the body (13) of the drainage assembly upon attachment of the drainage assembly to the outlet orifice of the reactor,
   wherein the seating piece (11) is removable and is manufactured as a flat annular seal having a central opening (25) that passes completely through the seating piece (11),
      an upper portion of the seating piece (11), facing the outlet orifice (6) of the reactor, has a first conical ramp (23) which surrounds and slopes toward the central opening (25) and a second conical ramp (24) which surrounds and slopes toward the first conical ramp (23),
      at least a portion of the first conical ramp (23) engages with a conical surface of the head (10) when the drainage assembly is in the closed position, to form a completely fluid tight seal therebetween and prevent the flow of fluid through the outlet orifice (6), and
      the first seating conical surface (23) is disposed axially between the planar frontal surface (7) and the sandwiching surface (12A) of the upper flanged portion (12).

2. The drainage assembly according to claim 1, wherein the second conical ramp is disposed axially between the planar frontal surface (7) and the sandwiching surface (12A) of the upper flanged portion (12) and the first conical ramp (23) is axially spaced from the sandwiching surface (12A) of the upper flanged portion (12).

3. The drainage assembly according to claim 1, wherein upper and lower surfaces of the seating piece (11) each have an annular external framework (27) which comprises one of a reinforced area and a peripheral disc, and
   an annular internal framework is located between annular external framework (27).

4. The assembly according to claim 1, wherein the first conical ramp (23) forms a shoulder of the central opening (25).

5. The assembly according to claim 4, wherein the first conical ramp (23) has a greater slope and is narrower in width than the second conical ramp (24).

6. The assembly according to claim 1, wherein a surface area of the fluid tight seal, formed between the removable seating piece (11) and a lower periphery of the head (10) of the valve, is less than a surface area of the second conical ramp (24).

7. The assembly according to claim 4, wherein the first conical ramp (23) forms an upper edge of the central opening (25) and also forms a watertight contact with a lower portion of the head (10) of the valve,
   the first conical ramp (23) and the second conical ramp (24) together define a flow ramp, and
   the second conical ramp (24) has a smaller slope than the first conical ramp (23).

8. The drainage assembly according to claim 1, wherein the seating piece (11) has an annular internal framework.

9. The drainage assembly according to claim 1, wherein upper and lower surfaces of the seating piece (11) each have an annular external framework (27) which comprises one of a reinforced area and a peripheral disc.

10. The drainage assembly according to claim 3, wherein the body (13) of the drainage assembly radially surrounds the seating piece (11).

11. The drainage assembly according to claim 1, wherein the head (10) of a movable valve element of the drainage assembly extends upward into a cylindrical portion of the reactor.

12. The drainage assembly according to claim 1, wherein an upper portion of the head (10) houses a temperature sensor (23).

13. The drainage assembly according to claim 1, wherein the head (10) terminates in a surface that is substantially flush with a bottom of the reactor when the head (10) of the movable valve element of the drainage assembly is in the open position.

14. The drainage assembly according to claim 1, wherein a conical base surface of the head (10) of the movable element on the drainage assembly abuts against and forms the fluid tight seal with the seating piece (11).

15. The drainage assembly according to claim 1, wherein the removable seating piece (11) is enclosed by a metal fireproof rim (38) which increases an amount of time that the seating piece (11) of the drainage element remains effective in facilitating fluid retention in an event of a fire.

16. The drainage assembly according to claim 15, wherein the peripheral metal fireproof rim (38) includes a shoulder (39).

17. An interchangeable drainage assembly for a cylindrical outlet orifice of one of an enameled chemical reactor having one of a flange type outlet (5) and a pipe outlet (4), for attachment to an exterior structure of the orifice, the drainage assembly comprising:
   a valve (8) comprising a head (10) for forming a fluid tight seal with a mating seating piece (11), the head (10, when in an open position, facilitating drainage of the reactor via an outlet orifice (6) of the reactor, and the head (10), when in a closed position, forming a fluid tight seal which facilitates fluid retention within the reactor and prevents flow through the outlet orifice (6); and
   the valve (8), the head (10), the seating piece (11) and a mechanical body (13) forming the drainage assembly;
   wherein the seating piece (11) is sandwichable between the reactor and an upper flanged portion (12) of the body (13) of the drainage assembly, the seating piece (11) is removable and is manufactured as a flat annular seal with a planar reactor abutting surface and a planar body abutting surface and a central opening (25) that extends axially from the reactor abutting surface to the body abutting surface completely through the seating piece (11), the seating piece (11) has a first conical ramp (23) which surrounds and slopes toward the central opening (25) and a second conical ramp (24) which surrounds and slopes toward the first conical ramp (23), at least a portion of the first conical ramp (23) engages with a mating conical surface of the head (10), when the drainage assembly is in the closed position, to form the fluid tight seal and prevent the flow of fluid through the outlet orifice (6), and the first seating conical surface (23) is disposed axially between the reactor abutting surface and the body abutting surface.

18. An interchangeable drainage assembly for a cylindrical outlet orifice of one of an enameled chemical reactor having one of a flange type outlet (5) and a pipe outlet (4), for attachment to an exterior structure of the orifice, the drainage assembly comprising:

a valve (8) comprising a head (10) for forming a fluid tight seal with a mating seating piece (11), the head (10), when moved into an open position spaced from the seating piece (11), facilitating drainage of the reactor via an outlet orifice (6) of the drainage assembly, and the head (10), when moved into a closed position in abutting engagement with the seating piece (11) forming a fluid tight seal so as to facilitate retaining a fluid within the reactor and preventing flow through the outlet orifice (6);

the valve (8), the head (10), the seating piece (11) and a mechanical body (13) forming the drainage assembly; and the seating piece (11) contacting a planar edge surface of the outlet orifice (6) forming a planar frontal surface (7), and the seating piece (11) being sandwiched between the planar frontal surface (7) of the reactor and an upper flanged portion (12) of the body (13) of the drainage assembly upon attachment of the drainage assembly to the outlet orifice of the reactor, wherein the seating piece (11) is removable and is manufactured as a flat annular seal which has a central opening (25) which passes completely through the seating piece (11), an upper surface of the seating piece (11), facing the outlet orifice (6), has a first conical ramp (23) which converges centrally toward the central opening (25) and a second conical ramp (24) which surrounds and slopes toward the first conical ramp (23), the head (10) has a mating head conical surface which, when the drainage assembly is in the closed position, engages with the first conical ramp (23) to form a completely fluid tight seal therebetween and prevent the flow of fluid through the outlet orifice (6), and both the first conical ramp (23) and the second conical ramp (24) slope toward the central opening (25) so as to facilitate drainage through the outlet orifice (6) of the reactor and avoid creation of any fluid retention area within the drainage assembly.

* * * * *